(12) United States Patent
Tus

(10) Patent No.: US 10,574,638 B2
(45) Date of Patent: *Feb. 25, 2020

(54) MULTI-FACTOR EXECUTION GATEWAY

(71) Applicant: MICROSOFT TECHNOLOGY LICENSING, LLC, Redmond, WA (US)

(72) Inventor: Alan Tus, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,617

(22) Filed: Apr. 15, 2019

(65) Prior Publication Data

US 2019/0245838 A1 Aug. 8, 2019

Related U.S. Application Data

(63) Continuation of application No. 15/625,102, filed on Jun. 16, 2017, now Pat. No. 10,305,874.

(51) Int. Cl.
*H04L 9/00* (2006.01)
*H04L 29/06* (2006.01)
*G06F 21/33* (2013.01)
*H04L 9/08* (2006.01)
*G06F 21/62* (2013.01)
(Continued)

(52) U.S. Cl.
CPC .......... *H04L 63/062* (2013.01); *G06F 21/121* (2013.01); *G06F 21/335* (2013.01); *G06F 21/629* (2013.01); *H04L 9/0866* (2013.01); *H04L 9/3271* (2013.01); *H04L 63/02* (2013.01); *H04L 63/06* (2013.01); *H04L 63/10* (2013.01); *H04L 63/105* (2013.01); *H04L 63/126* (2013.01); *G06F 2221/2113* (2013.01)

(58) Field of Classification Search
CPC ........ H04L 63/02; H04L 63/10; H04L 63/062
See application file for complete search history.

(56) References Cited

U.S. PATENT DOCUMENTS 6,880,107 B1 * 4/2005 Kraft, IV ................ G06F 11/08
713/2
7,194,618 B1 * 3/2007 Suominen ............... G06F 21/64
713/155

(Continued)

*Primary Examiner* — Beemnet W Dada
(74) *Attorney, Agent, or Firm* — Liang IP, PLLC

(57) ABSTRACT

A user may desire to execute a process in a target environment. However, administrators may want control over processes that haven't been preapproved to prevent the execution of processes that may affect security and compliance within the environment. Implementation of a multi-factor execution gateway may grant the user limited access to execute the process himself at an otherwise restricted, protected, or decoupled environment, while ensuring security and compliance by obtaining approval from the appropriate authorities. For example, a request to execute the process in the environment may be detected, and a fingerprint may be generated based on parameters of the request. A signature for the fingerprint in the form of private key(s) acquired from authorizer(s) based on a level of authorization required for the process may be received to generate a key, and execution of the process may then be allowed at the environment using the key.

20 Claims, 9 Drawing Sheets

(51) Int. Cl.
*G06F 21/12* (2013.01)
*H04L 9/32* (2006.01)

(56) References Cited

U.S. PATENT DOCUMENTS

| | | | |
|---|---|---|---|
| 7,958,346 B2* | 6/2011 | Wong | G06F 21/6209 |
| | | | 711/114 |
| 9,893,898 B2* | 2/2018 | Kreft | G06F 21/71 |
| 10,305,874 B2* | 5/2019 | Tus | H04L 63/062 |
| 2008/0155264 A1* | 6/2008 | Brown | H04L 63/145 |
| | | | 713/177 |
| 2013/0311770 A1* | 11/2013 | Reffe | G05B 19/418 |
| | | | 713/155 |

* cited by examiner

MULTI-FACTOR EXECUTION GATEWAY

CROSS-REFERENCE TO RELATED APPLICATION(S)

This application is a continuation of and claims priority to U.S. patent application Ser. No. 15/625,102, filed on Jun. 16, 2017.

BACKGROUND

A user may want to execute a process in a target environment that may be restricted, protected, and/or decoupled. Administrators or similar persons having authority over the environment may want to have control over these types of processes if they haven't been preapproved to prevent the execution of processes that may affect security and compliance of the environment.

Currently, if a user wants to execute a process in a target environment that he or she does not have access to, the user may have to contact one or more peers to review the process, and then contact a triage person (e.g., a person who has authority to grant execution) to review and grant execution of the process upon the peers' approval. After receiving the grant, an operations person may then execute the script at the environment. In such scenarios, it may be an improvement to grant the user limited access to execute the process themselves at the target environment (instead of the operations person), while still ensuring security and compliance by obtaining approval from the appropriate authority.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to implementation of a multi-factor gateway. A request to execute a process in a target environment may be detected, and a fingerprint may be generated based on one or more parameters associated with the request. A signature for the fingerprint may be received to generate a key, where the signature is in the form of one or more private keys acquired from one or more authorizers based on a level of authorization required for the process. Execution of the process may then be allowed at the target environment using the key.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
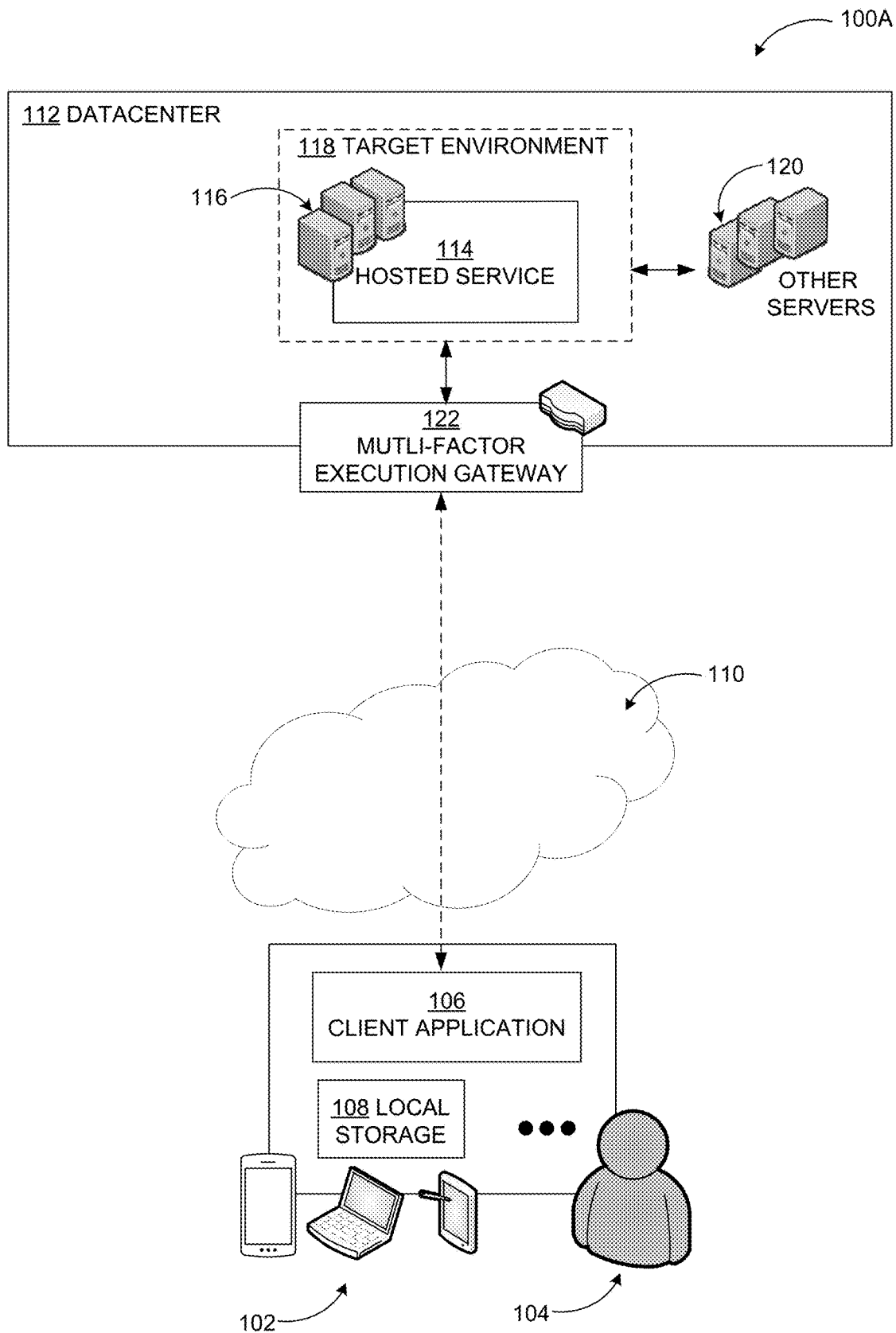
FIGS. 1A and 1B include display diagrams illustrating example network environments where a system to implement a multi-factor execution gateway may be implemented.

As briefly described above, embodiments are directed to implementation of a multi-factor gateway. A request to execute a process in a target environment may be detected, and a fingerprint may be generated based on one or more parameters associated with the request. A signature for the fingerprint may be received to generate a key, where the signature is in the form of one or more private keys acquired from one or more authorizers based on a level of authorization required for the process. Information within the key may include the signature (i.e., the private keys) and the fingerprint, for example. Execution of the process may then be allowed at the target environment using the key. For example, the key may be transmitted to the target environment, and the information within the key may be compared to a set of expected public keys and the request. In response to a determination that the information within the key matches the set of expected public keys and the request, the key may be validated and the process may be executed at the target environment. In response to a determination that the information within the key does not match the set of expected public keys and the request, the key may be rejected and the process may be prevented from being executed at the target environment.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for implementation of a multi-factor execution gateway. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1B:
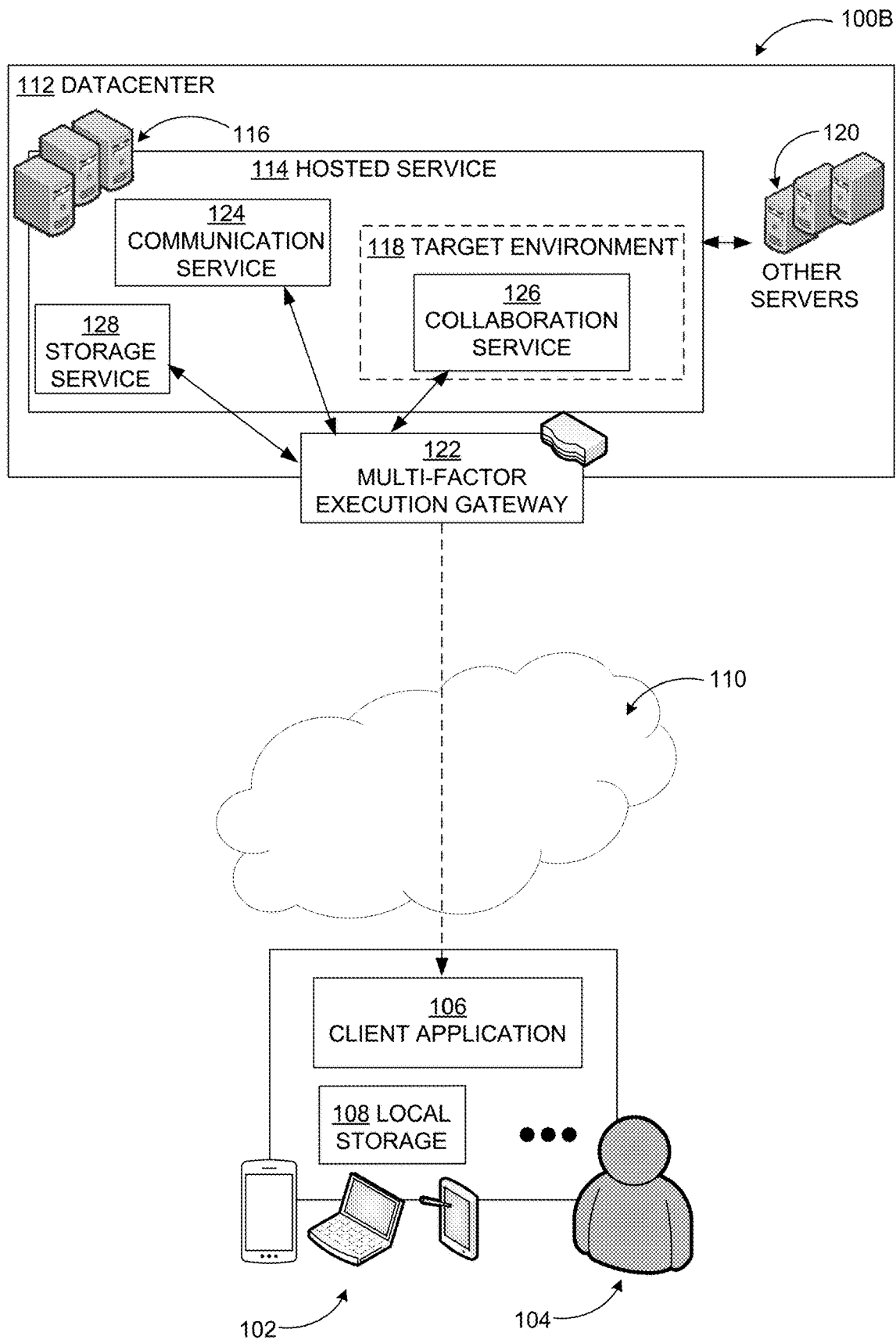

FIGS. 1A and 1B include display diagrams illustrating example network environments where a system to implement a multi-factor execution gateway may be implemented.

As illustrated in diagrams 100A and 100B, an example system may include a datacenter 112 executing a hosted service 114 on at least one processing server 116, which may provide a productivity service, a communication service 124, a collaboration service 126, a storage service 128, and other comparable services to users in conjunction with other servers 120, for example. The hosted service 114 may further include scheduling services, online conferencing services, and comparable ones. The hosted service 114 may be configured to interoperate with a client application 106 through one or more client devices 102 over one or more networks, such as network 110. The client devices 102 may include a desktop computer, a laptop computer, a tablet computer, a vehicle-mount computer, a smart phone, or a wearable computing device, among other similar devices. In some examples, the hosted service 114 may allow users to access its services through the client application 106 executed on the client devices 102. In other examples, the hosted service 114 may be provided to a tenant (e.g., a business, an organization, or similar entities), which may configure and manage the services for their users. Local storage 108 of the client devices 102 may store items associated with the client application 106, where the items may also be stored remotely in a storage server among the other servers 120, for example.

The datacenter 112 may also include a multi-factor execution gateway 122 that is configured to allow execution of a process at a target environment 118 associated with the hosted service 114, where the multi-factor execution gateway 122 is located outside of the target environment 118.

The target environment 118 may be the environment of the hosted service 114 itself, as shown in the diagram 100A, and/or may be the environment of a service within the hosted service 114, such as the environment of the collaboration service 126, as shown in the diagram 100B. In other examples, the target environment 118 may be a disconnected or decoupled environment, such as a virtual private network (VPN). Another example may be a network that is completely off the grid such as a pharmaceutical or government facility requiring a high level of security and protection.

The multi-factor execution gateway 122 may also be configured to allow execution of the process at multiple different target environments and/or a combination of target environments using a single generated key, as discussed below. As described herein, the hosted service 114 and the multi-factor execution gateway 122 may be implemented as software, hardware, or combinations thereof.

In an example embodiment, the multi-factor execution gateway 122 may be configured to detect a request to execute a process at the target environment 118 from a user 104. For example, the multi-factor execution gateway 122 may intercept the request as it is transmitted from the client application 106 to the hosted service 114 with which the target environment 118 is associated. The process may be an existing script, an existing command, a custom script, a configuration file, or a combination of these, among other examples.

The multi-factor execution gateway 122 may be configured to generate a fingerprint for the process based on one or more parameters of the request. The parameters may include a name of the process, tasks or jobs associated with the process (e.g., what the process is supposed to do or achieve), the target environment 118, a date and a time of the request, and an alias of the requesting user 104. The parameters may also indicate a level of authorization required for the process, a number and a type of authorizers required to allow the execution of the process based on the level of authorization, and/or a number of times the process may be executed through this request (e.g., a one-time execution or multiple executions). Some of the parameters may be defined by the requesting user 104, while other parameters may be automatically defined based on the input from the requesting user 104. For example, in response to the requesting user 104 defining a name of the process, tasks or jobs associated with the process, and one or more target environments or a combination of target environments, the level of authorization for the process at those target environments and a number and a type of authorizers required to allow the execution of the process based on the level of authorization may be automatically defined. The fingerprint generated based on these parameters is a unique identifier for this execution of the process. In some embodiments, additional information may be added to the fingerprint to limit the execution time window, the scope of the execution, and other aspects of the task or jobs associated with the process to add more security.

The multi-factor execution gateway 122 may then be configured to receive a signature for the fingerprint in order to generate a key. The signature is in the form of one or more private keys acquired from the number and type of the authorizers required to allow execution of the process. The authorizers may be the user 104, a peer reviewer, and/or an authorization authority, and thus the private keys may be a user private key, a peer reviewer private key, and/or an authorization authority private key, respectively.

The level of authorization may be based on how risky execution of the process is with regards to maintaining safety and compliance within target environment. For example, if a destructive or accidental action associated with the process may render a portion of the environment irreversibly destroyed, the highest level of authorization may be required. The level of authorization may include, but is not limited to, auto-signed, self-signed, remote-signed, or multiple party remote-signed. The level of authorization may be one or a combination of these above-mentioned levels. If the level of authorization is auto-signed, no private keys have to be acquired for the signature, and the key may be automatically generated by the multi-factor execution gateway 122. If the level of authorization is self-signed, only the user private key may be acquired for the signature in order to generate the key. Alternatively, instead of a public-private key authentication, a hashing mechanism may be employed to create a key to challenge the user 104 to enter it. If the level of authorization is remote-signed, the user private key and at least one other private key, such as the peer reviewer key or the authorization authority key, may be acquired for the signature in order to generate the key. If the level of authorization is multiple-party remote-signed, the user private key and at least two other private keys, such as the peer reviewer private key and the authorization authority private key, may be acquired for the signature in order to generate the key. Once all the necessary private keys have been acquired, the key may be generated. In some embodiments, a higher level of authorization (e.g., a greater number and/or type of private keys than necessary) may be acquired, and the key may still be generated. Information within the key may include the private keys acquired for the signature of the fingerprint and the fingerprint.

Once the signature has been received and the key generated, the multi-factor execution gateway 122 may be configured to transmit the key to the hosted service 114 with which the target environment 118 is associated for validation. The key may be validated by comparing the information within the key to a set of expected public keys and the request. The set of expected public keys may be one or more public keys corresponding to a minimal number and type of private keys necessary to be acquired for the signature of the fingerprint. For example, if the number and type of authorizers required to allow the execution of the process include the user, one peer reviewer, and one authorization authority based on a multi-party remote signed level of authorization, the set of expected public keys will include 3 public keys that correspond respectively to a user private key, a peer reviewer private key, and an authorization authority private key. Thus, the first comparison may be between the private keys actually acquired for the signature and the set of expected public keys to ensure the minimal number and type of private keys necessary to be acquired was met. The comparison will not fail if a greater number and type of private keys (e.g., a higher authorization level) were acquired. The second comparison may be between the fingerprint and the parameters of the request. If the information within the key matches both the set of expected public keys and the request, the key is validated and the process is executed at the target environment 118. If the key does not match the set of expected public keys and/or the key does not match the request, the key is rejected and the process is prevented from being executed at the target environment 118. Use of a public-private key is only one example of a secure signing mechanism. Other mechanisms may be used as well.

In an example scenario, the process may be an existing command, such as a "delete all" command, that can remove components of a search farm of a collaboration service. Such removal may render the search farm irreversibly broken, but the removal may also be safe in certain scenarios that may occur often. The multi-factor execution gateway may be employed to prevent accidental execution by ensuring that a user requesting to execute the command has to run the command twice and closely review the parameters of the command, while still allowing that user to execute the command himself at the search farm of the collaboration service.

In an example scenario, the user may run the "delete all" command. Initially, execution of the command may fail because a signature for a fingerprint of the command was not received. For example, the parameters of the request to execute the "delete all" command (and thus the fingerprint generated based on the parameters) may indicate a remote-signed level of authorization which requires a user private key and at least one other private key, such as a peer reviewer key to be acquired from the user and a peer reviewer, respectively, for the signature. Accordingly, the user may be prompted to include the signature if the user is sure he or she wants to run the "delete all" command with the parameters as defined in the request. Once the signature is received, the "delete all" command may be executed at the search farm of the collaboration service using a key generated with the signature.

As previously discussed, currently, if a user wants to execute a process in a target environment that he or she does not have access to, the user may have to contact one or more peers to review the process, and then contact a triage person (e.g., a person who has authority to grant execution) to review and grant execution of the process upon the peers' approval. After receiving the grant, an operations person may then execute the script at the environment. This process may be extremely cumbersome and time-consuming, having a tendency to lead to execution bottlenecks because only a small number of people have the access to grant and/or execute processes for a large number of users requesting the processes. Therefore, embodiments as described herein are directed to implementing a multi-factor execution gateway that grants a requesting user limited access to execute the process themselves at the target environment (instead of the operations person), while ensuring security and compliance by obtaining approval from the appropriate authority through the signing process. Use of a public-private key, as described in detail herein, is only one example of a secure signing mechanism. Other mechanisms may be used as well. Additionally, by using a key that is generated outside of the target environment to allow execution of the process at the target environment, the requesting user need not be given direct access to the target environment which helps to maintain a safe and compliant target environment, the environment may be decoupled (e.g., a VPN or other non-internet based environment, such as a network that is completely off the grid), and the key may be generated offline.

Embodiments, as described herein, address a need that arises from a very large scale of operations created by software-based services that cannot be managed by humans. The actions/operations described herein are not a mere use of a computer, but address results of a system that is a direct consequence of software used as a service offered in conjunction with a large number of users requesting to execute processes within a variety of service environments, which may be restricted, protected, and/or decoupled.

Figure 2:
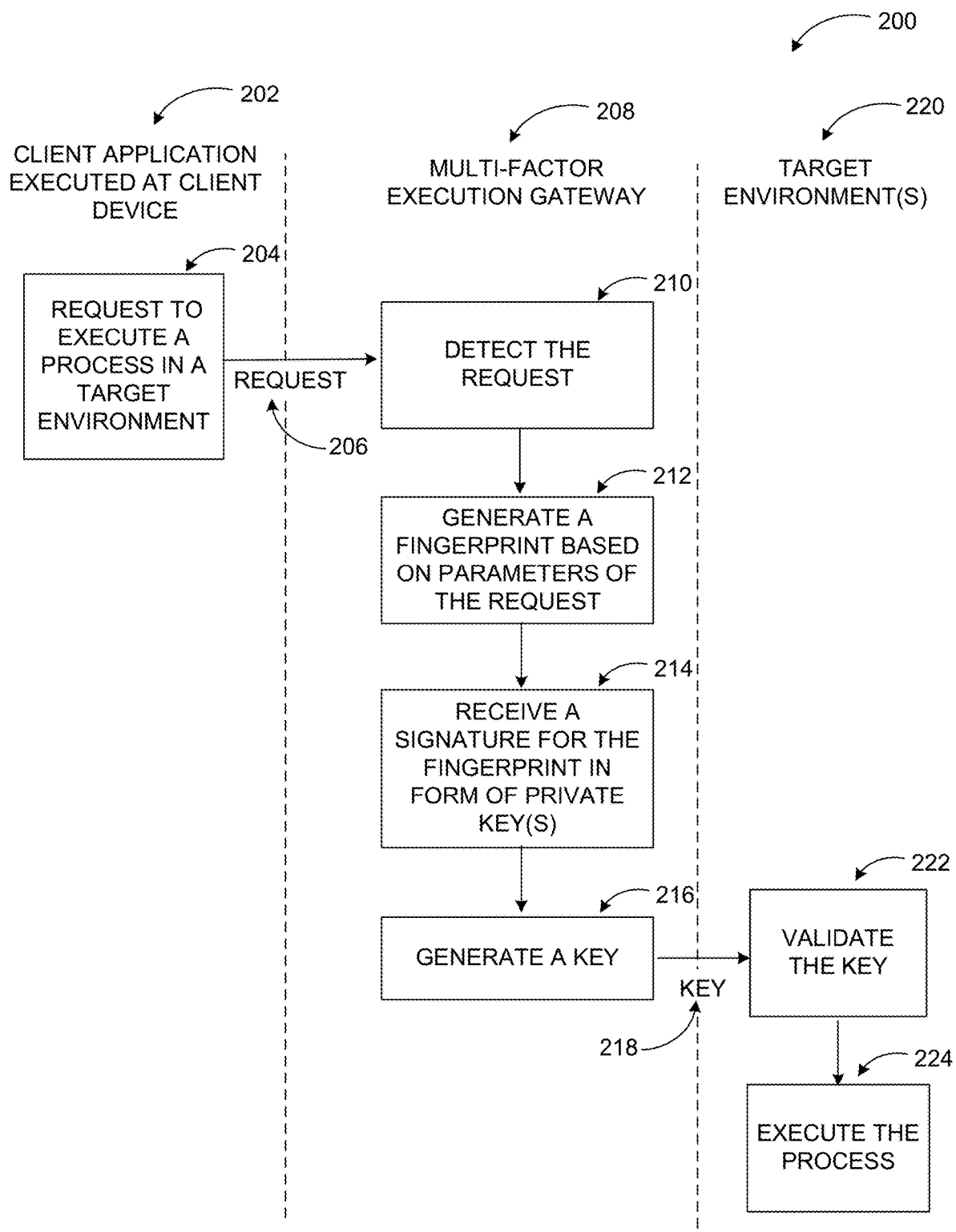
FIG. 2 includes a display diagram illustrating conceptually an example set of actions and components for implementing a multi-factor execution gateway.

FIG. 2 includes a display diagram illustrating conceptually an example set of actions and components for implementing a multi-factor execution gateway.

A hosted service may allow users to access its services through a client application associated with the service, where the client application is executed at a client device 202, as shown in diagram 200. For example, at operation 204, a user may submit a request 206 to execute a process at one or more target environment(s) and/or a combination of target environment(s) 220 through the client application executed at the client device 202. The target environments(s) 220 may be restricted, protected, and/or decoupled environments associated with the hosted service to which the user does not have access, for example.

At operation 210, the request 206 may be detected by a multi-factor execution gateway 208. For example, the multi-factor execution gateway 208 may intercept the request 206 as it is transmitted from the client application executed at the client device 202 to the hosted service with which the target environment(s) 220 are associated. The multi-factor execution gateway 208 may generate a fingerprint based on parameters of the request 206 at operation 212 and receive a signature of the fingerprint in the form of one or more private keys acquired from one or more authorizers based on a level of authorization required for the process at operation 214. The multi-factor execution gateway 208 may then, at operation 216, generate a key 218. Information within the key 218 may include the private keys acquired from the authorizers for the signature and the fingerprint.

The key 218 may be transmitted to each of the target environment(s) 220, where the key 218 may be validated at operation 222. To validate the key 218, the information within the key 218 may be compared to a set of expected public keys and the request 206. If a match is determined, the key 218 may be validated, and the process may be executed at the target environment(s) 220 at operation 224.

In an example scenario, to investigate search issues associated with a storage service, index contents may need be retrieved for a certain user, site, query, and/or document, which may be considered accessing customer data. To access customer data, particular permissions and/or background clearance may be required, and only a small number of users have such permissions and/or clearance. This may cause an execution bottleneck because those small number of users have to execute commands for each of the other users helping with the investigation that don't have clearance and forward them the data resulting from the execution. The execution bottleneck may be avoided by implementing the multi-factor execution gateway to allow all of the users, regardless if they have clearance or not, to have at least a limited ability to execute a command to retrieve index contents/access customer data at the storage service. For example, if a user without clearance requests to execute the command to retrieve index contents/access customer data from the storage service, the multi-factor execution gateway may detect the request and generate a fingerprint based on the request. The multi-factor execution gateway may receive a signature for the fingerprint to generate a key, where the signature is in form of an authorization authority private key acquired from one of the users with clearance. Information within the key may include the authorization authority private key acquired from one of the users with clearance for the signature and the fingerprint. The execution of the command at the storage service may then be allowed using the key.

Figure 3:
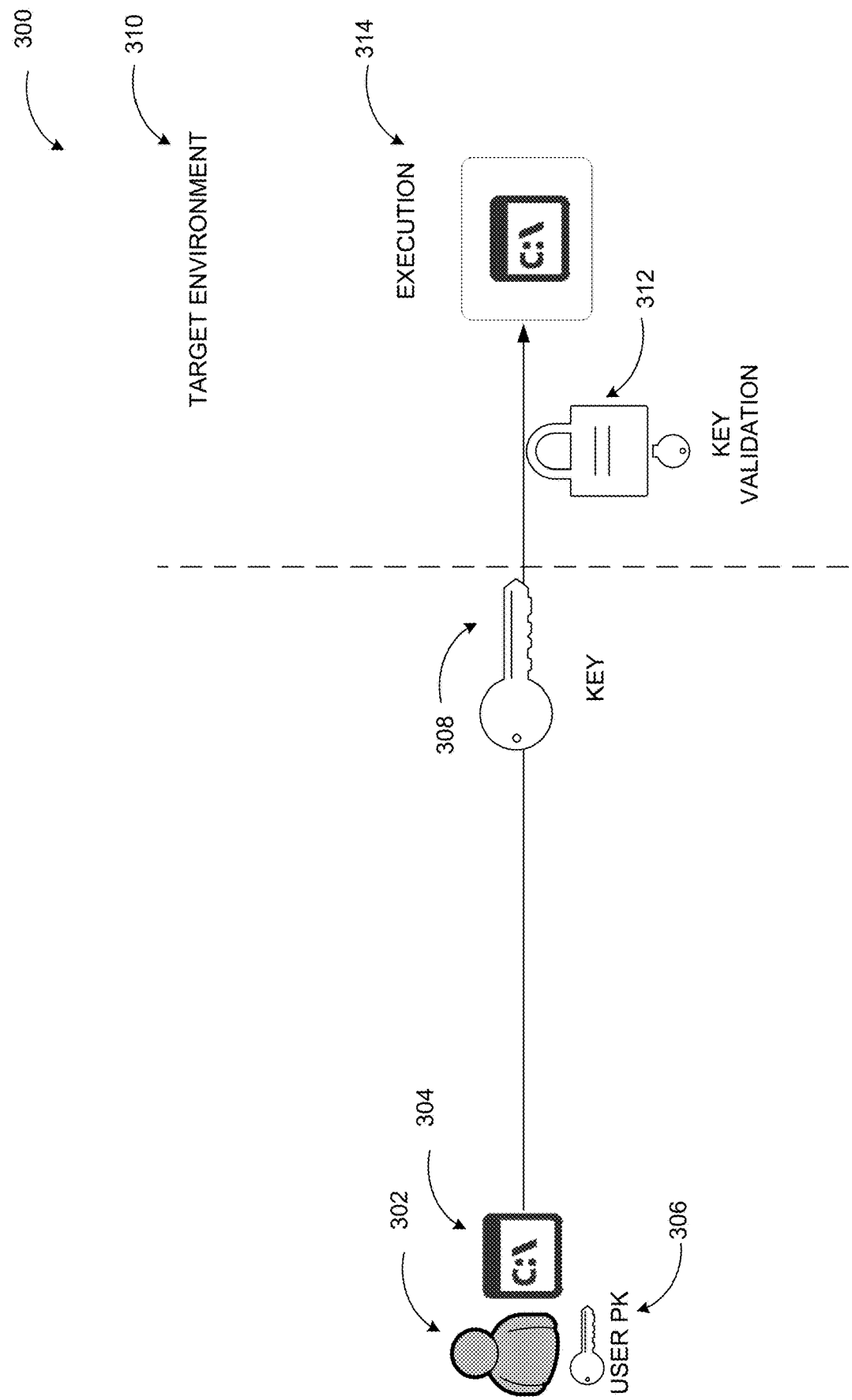
FIG. 3 includes a display diagram illustrating an example scenario in which a multi-factor execution gateway is implemented for execution of an existing command.

FIG. 3 includes a display diagram illustrating an example scenario in which a multi-factor execution gateway is implemented for execution of an existing command.

As shown in a diagram 300, a user 302 may desire to execute an existing command 304. The user 302 may request to execute the command 304 at a target environment 310. A multi-factor execution gateway outside of the target environment 310 may be configured to detect the request and generate a fingerprint based on one or more parameters of the request. The parameters of the request may include a name of the command 304, tasks or jobs associated with the command 304, the target environment 310, a date and a time of the request, and an alias of the user 302. The parameters may also indicate that a level of authorization required for execution of the command 304 is self-signed, the user 302 is the authorizer required to allow the execution of the command 304 based on the self-signed level of authorization, and a one-time execution of the command 304 is granted. The fingerprint generated based on these parameters is a unique identifier for this particular execution of the command 304 in response to the request. In some embodiments, additional information may be added to the fingerprint to limit the execution time window, the scope of the execution, and other aspects of the task or jobs associated with the command 304 to add more security.

The multi-factor execution gateway may receive a signature of the fingerprint to generate a key 308. The signature is in the form of private keys acquired from the authorizers based on the level of authorization. Because the level of authorization is self-signed, a user private key 306 may be acquired from the user 302 for the signature of the fingerprint in order to generate the key 308. Information within the key 308 may include the signature (i.e., the user private key 306) and the fingerprint. The key 308 may be transmitted from the multi-factor execution gateway to the target environment 310.

The key 308 may be validated 312 at the target environment 310 if a comparison of the information within the key 308 to a set of expected public keys and the request yields a match. For example, the key 308 may be validated 312 if the user private key 306 corresponds to the expected public key, and the fingerprint corresponds to the parameters of the request. In response to validation of the key 308, the command 304 may be executed 314.

Figure 4:
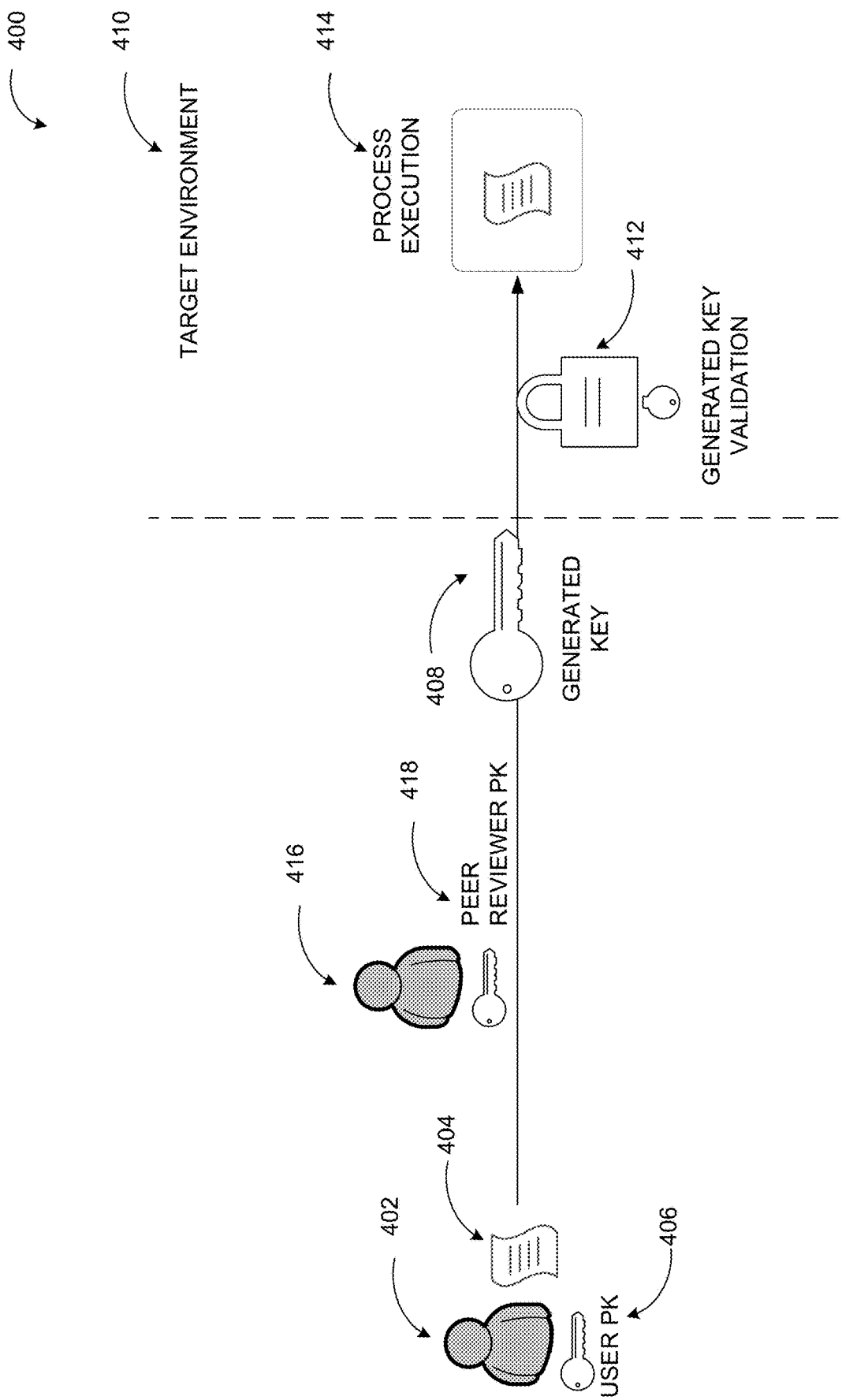
FIG. 4 includes a display diagram illustrating another example scenario in which a multi-factor execution gateway is implemented for execution of a custom script.

FIG. 4 includes a display diagram illustrating another example scenario in which a multi-factor execution gateway is implemented for execution of a custom script.

As shown in a diagram 400, a user 402 may create a custom script 404. The user 402 may request to execute the custom script 404 at a target environment 410. A multi-factor execution gateway outside of the target environment 410 may be configured to detect the request and generate a fingerprint based on one or more parameters of the request. The parameters of the request may include a name of the custom script 404, tasks or jobs associated with the custom script 404, the target environment 410, a date and a time of the request, and an alias of the user 402. The parameters may also indicate that a level of authorization required for execution of the custom script 404 is remote-signed, the user 402 and a peer reviewer 416 are the authorizers required to allow the execution of the custom script 404 based on the remote-signed level of authorization, and one execution of the custom script 404 is granted. The fingerprint generated based on these parameters is a unique identifier for this particular execution of the custom script 404 in response to the request. In some embodiments, additional information may be added to the fingerprint to limit the execution time window, the scope of the execution, and other aspects of the task or jobs associated with the custom script 404 to add more security.

The multi-factor execution gateway may receive a signature of the fingerprint to generate a key 408. The signature is in the form of private keys acquired from the authorizers based on the level of authorization. Because the level of authorization is remote-signed, a user private key 406 and a peer reviewer private key 418 may be acquired from the user 402 and from the peer reviewer 416, respectively, for the signature in order to generate the key 408. Information within the key 408 may include the signature (i.e., the user private key 406 and the peer reviewer private key 418) and the fingerprint. The key 408 may be transmitted from the multi-factor execution gateway to the target environment 410.

The key 408 may be validated 412 at the target environment 410 if a comparison of the information within the key 408 to a set of expected public keys and the parameters of the request yields a match. For example, the key 408 may be validated 412 if the user private key 406 and the peer reviewer private key 418 correspond to the expected public keys and the fingerprint corresponds to the parameters of the request. In response to validation of the key 408, the custom script 404 may be executed 414.

Figure 5:
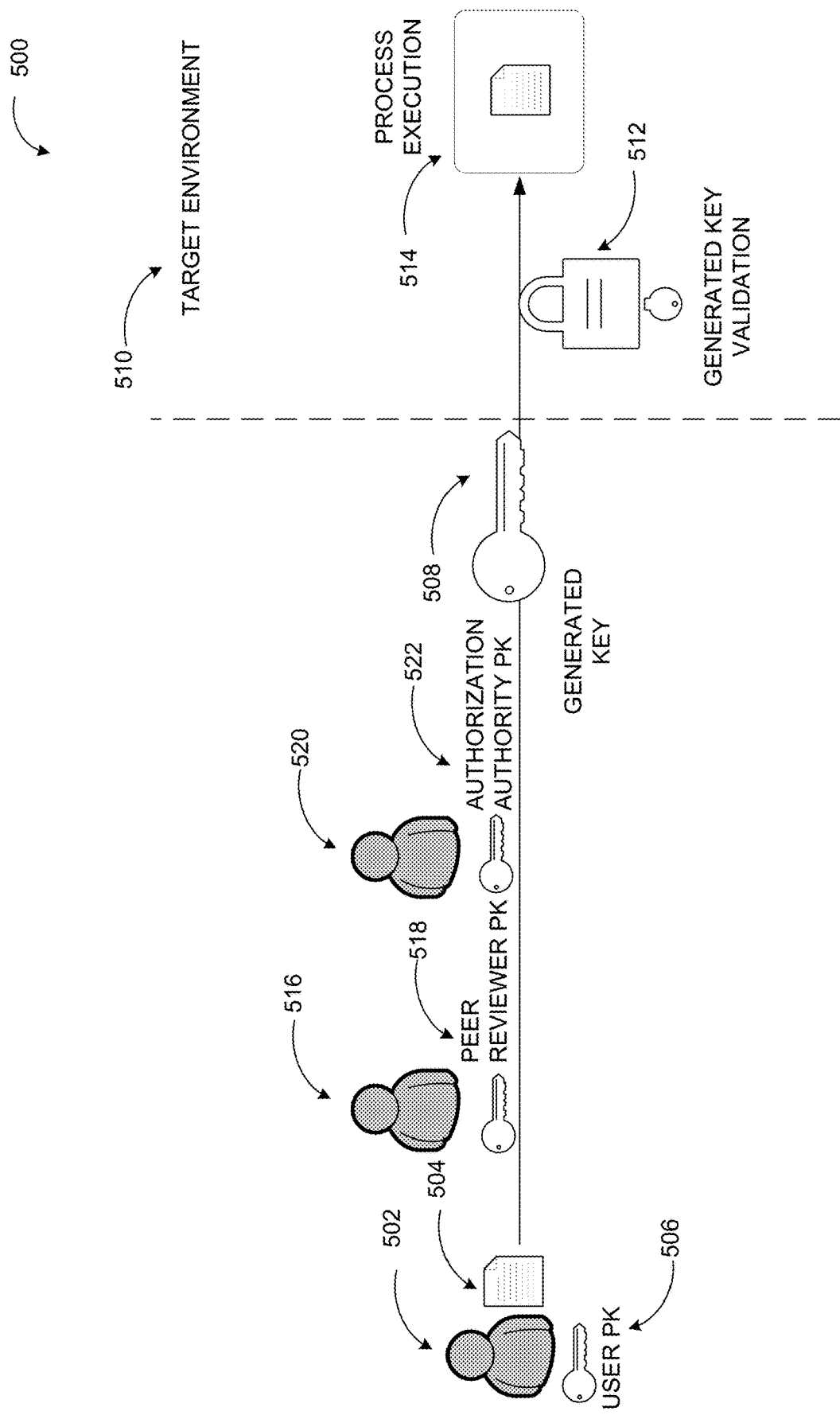
FIG. 5 includes a display diagram illustrating a further example scenario in which a multi-factor execution gateway is implemented for execution of a configuration file.

FIG. 5 includes a display diagram illustrating a further example scenario in which a multi-factor execution gateway is implemented for execution of a configuration file.

As shown in a diagram 500, a user 502 may create a configuration file 504. The user 502 may request to execute the configuration file 504 at a target environment 510. A multi-factor execution gateway outside of the target environment 510 may be configured to detect the request and generate a fingerprint based on one or more parameters of the request. The parameters of the request may include a name of the configuration file 504, tasks or jobs associated with the configuration file 504, the target environment 510, a date and a time of the request, and an alias of the user 502. The parameters may also indicate that a level of authorization required for execution of the configuration file 504 is multiple party remote-signed, the user 502, a peer reviewer 516, and an authorization authority 520 are authorizers required to allow the execution of the configuration file 504 based on the multiple party remote-signed level of authorization, and multiple executions of the configuration file 504 are granted. The fingerprint generated based on these parameters is a unique identifier for this particular execution of the configuration file 504 in response to the request. In some embodiments, additional information may be added to the fingerprint to limit the execution time window, the scope of the execution, and other aspects of the task or jobs associated with the configuration file 504 to add more security.

The multi-factor execution gateway may receive a signature of the fingerprint to generate a key 508. The signature is in the form of private keys acquired from the authorizers based on the level of authorization. Because the level of authorization is multiple party remote-signed, a user private key 506, a peer reviewer key 518, and an authorization authority key 522 may be acquired from the user 502, the peer reviewer 516, and the authorization authority 520, respectively, for the signature in order to generate the key 508. Information within the key 508 may include the signature (i.e., the user private key 506, the peer reviewer private key 518, and the authorization authority private key 522) and the fingerprint. The key 508 may be transmitted from the multi-factor execution gateway to the target environment 510.

The key 508 may be validated 512 at the target environment 510 if a comparison of the information within the key 508 to a set of expected public keys and the parameters of the request yields a match. For example, the key 508 may be validated 512 if the user private key 506, the peer reviewer private key 518, and the authorization authority private key 522 correspond to the expected public keys, and the fingerprint corresponds to the parameters of the request. In response to validation of the key 508, the configuration file 504 may be executed 514.

The examples provided in FIGS. 1A through 5 are illustrated with specific systems, services, applications, and scenarios. Embodiments are not limited to environments according to these examples. Implementing a multi-factor execution gateway may be implemented in environments employing fewer or additional systems, services, applications, and scenarios. Furthermore, the example systems, services, applications, and scenarios shown in FIG. 1A through 5 may be implemented in a similar manner with other user action flow sequences using the principles described herein.

Figure 6:
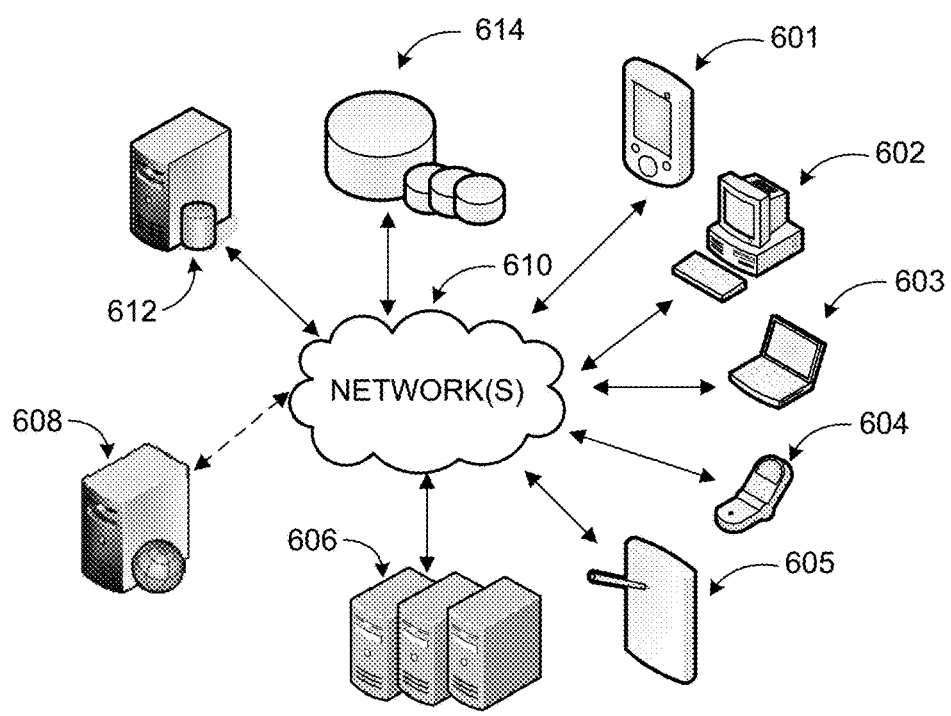
FIG. 6 is a networked environment, where a system according to embodiments may be implemented.

FIG. 6 is a networked environment, where a system according to embodiments may be implemented. A multi-factor execution gateway as described herein may be employed in conjunction with hosted applications and services (for example, the client application 106 associated with the hosted service 114 or the hosted service 114 with which a target environment 118 is associated with) that may be implemented via software executed over one or more servers 606 or individual server 608, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface, presented to users.

Client devices 601-605 are used to access the functionality provided by the hosted service or client application. One or more of the servers 606 or server 608 may be used to provide a variety of services as discussed above. Relevant data may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, engines, data sources, and data distribution systems may be employed to implement a multi-factor execution gateway. Furthermore, the networked environments discussed in FIG. 6 are for illustration purposes only. Embodiments are not limited to the example applications, engines, or processes.

Figure 7:
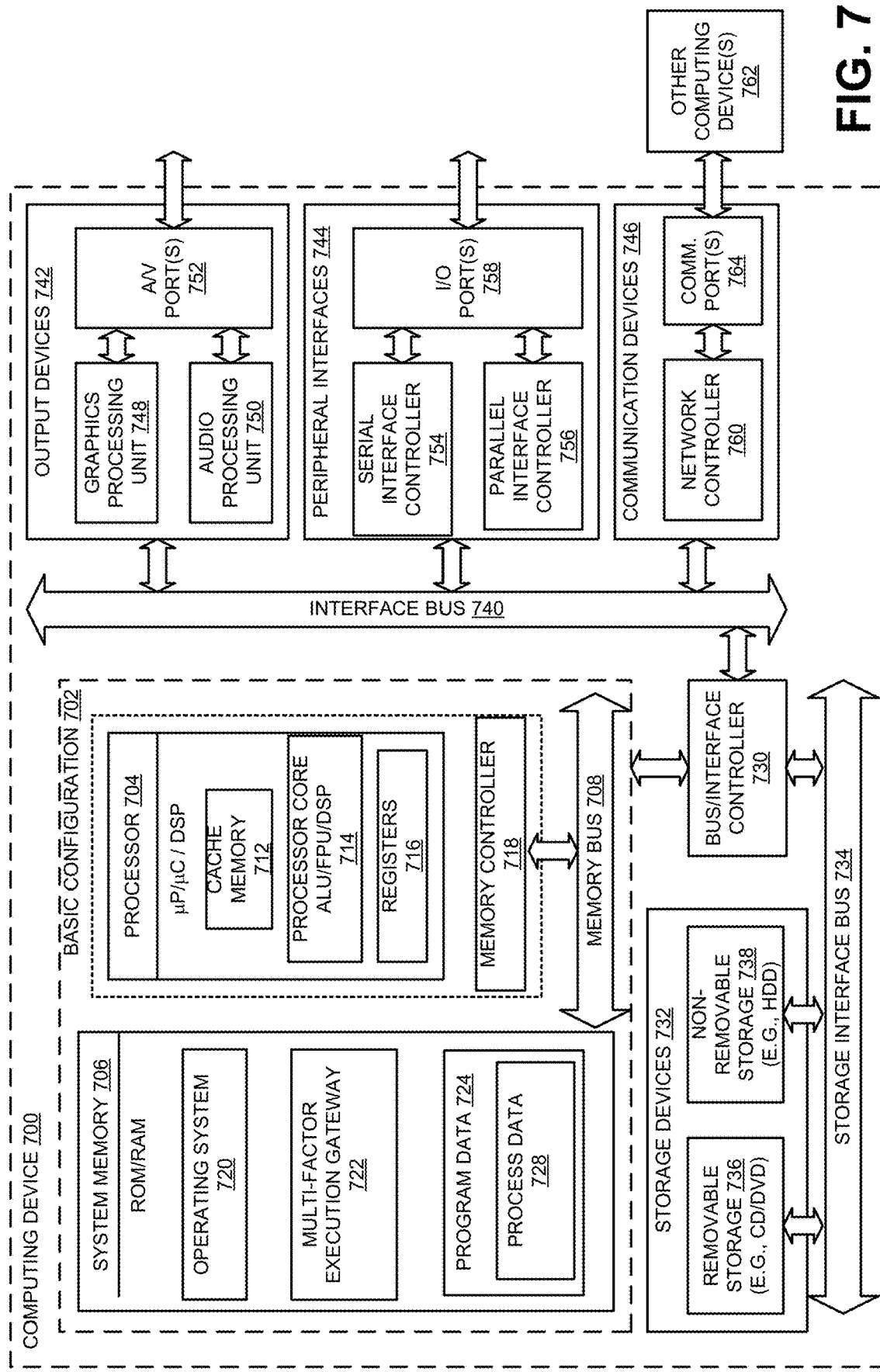
FIG. 7 is a block diagram of an example computing device, which may be used to implement a multi-factor execution gateway.

FIG. 7 is a block diagram of an example computing device, which may be used to implement a multi-factor execution gateway.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a multi-factor execution gateway 722, and program data 724. The multi-factor execution gateway 722 may be configured to detect a request to execute a process in a target environment, generate a fingerprint based on one or more parameters associated with the request, receive a signature for the fingerprint to generate a key, where the signature is in form of one or more private keys acquired from one or more authorizers based on a level of authorization required for the process, and allow execution of the process at the target environment using the key. The program data 724 may include process data 728, including data associated with the request parameters, fingerprint, signature, and/or key, among other data, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to implement a multi-factor execution gateway. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
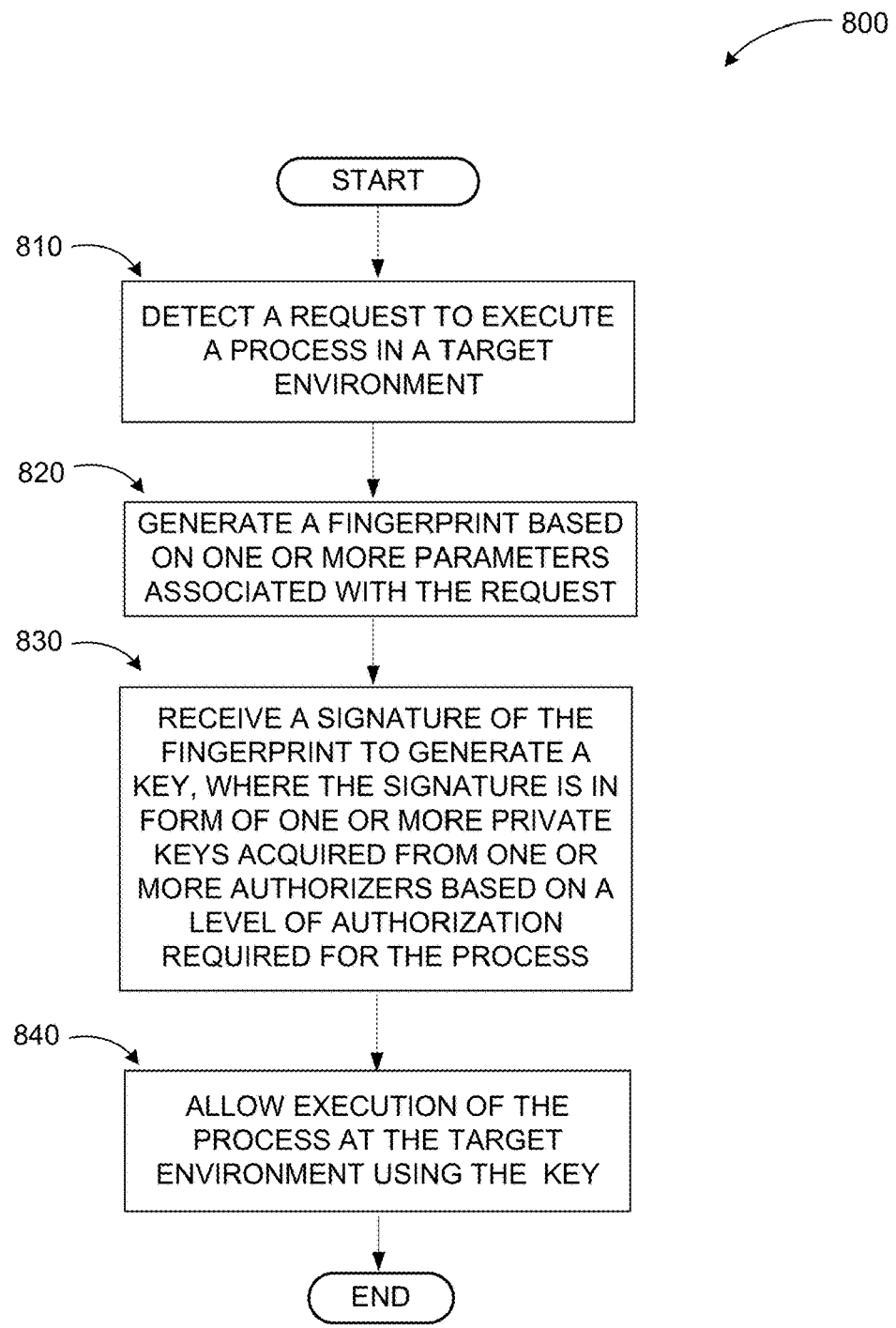
FIG. 8 illustrates a logic flow diagram of a method to implement a multi-factor execution gateway, arranged in accordance with at least some embodiments described herein.

FIG. 8 illustrates a logic flow diagram of a method to implement a multi-factor execution gateway. Process 800 may be implemented on a computing device, server, or other system. An example server may comprise a communication interface to facilitate communication between another server associated with a target environment, one or more client devices, and the server. The server may also comprise a memory to store instructions, and one or more processors coupled to the memory. The processors, in conjunction with the instructions stored on the memory, may be configured to implement a multi-factor execution gateway.

Process 800 begins with operation 810, where the processors may be configured to detect a request to execute a process in a target environment. For example, the processors may intercept the request as it is being transmitted to the target environment from a client application that is being executed on a client device of a user requesting to execute the process. The process may be an existing script, an existing command, a custom script, a configuration file, or a combination of these, for example.

At operation 820, the processors may be configured to generate a fingerprint based on one or more parameters associated with the request. The parameters may include a name of the process, tasks or jobs associated with the process, one or more target environments or a combination of target environments, a date and a time of the request, an alias of the user, a level of authorization, a number and a type of authorizers required to allow the execution of the process based on the level of authorization, and/or a number of times the process may be executed using this same request. Some of the parameters may have been defined by the user, while other parameters may have been automatically defined based on the input from the user.

At operation 830, the processors may be configured to receive a signature for the fingerprint to generate a key, where the signature is in form of one or more private keys acquired from one or more authorizers based on a level of authorization required for the process. The level of authorization may be based on how risky execution of the process is with regards to maintaining safety and compliance within target environment. The level of authorization may be auto-signed, self-signed, remote-signed, or multiple party remote-signed, for example, or a combination of these above-mentioned levels. Based on the level of authorization required, the private keys may be a user private key, a peer reviewer private key, and/or an authorization authority private key acquired from the user, a peer reviewer, and/or an authorization authority, respectively. In some embodiments, a higher level of authorization (e.g., a greater number and/or type of private keys than necessary) may be acquired. Information within the generated key may include the private keys acquired from the authorizers for the signature and the fingerprint.

At operation 840, the processors may be configured to allow execution of the process at the target environment using the key. For example, the key may be transmitted to the target environment, and the information within the key may be compared to a set of expected public keys and the request in order to validate the key and execute the process at the target environment. By using a key that is generated outside of the target environment to allow execution of the process at the target environment, a requesting user need not be given direct access to the target environment which helps to maintain a safe and compliant target environment, the target environment may be decoupled (e.g., a VPN or other non-internet based environment such as a network that is completely off the grid), and the key may be generated offline.

The operations included in process 800 are for illustration purposes. A multi-factor execution gateway may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to example embodiments, means to implement a multi-factor execution gateway are provided. Example means include detecting a request to execute a process in a target environment, generating a fingerprint based on one or more parameters associated with the request, receiving a signature for the fingerprint to generate a key, where the signature is in form of one or more private keys acquired from one or more authorizers based on a level of authorization required for execution of the process, and allowing the execution of the process at the target environment using the key.

According to some examples, methods to implement a multi-factor execution gateway are provided. Example methods may include detecting a request to execute a process in a target environment, generating a fingerprint based on one or more parameters associated with the request, receiving a signature for the fingerprint to generate a key, where the signature is in form of one or more private keys acquired from one or more authorizers based on a level of authorization required for execution of the process, and allowing the execution of the process at the target environment using the key.

In other examples, the key may be transmitted to the target environment, where information within the key may be compared to a set of expected public keys and the request in order to validate the key. The key may be validated and the process may be executed at the target environment in response to a determination that the information within the key matches the set of expected public keys and the request. The key may be rejected and the process may be prevented from being executed at the target environment in response to a determination that the information within the key does not match one or both of the set of expected public keys and the request.

In further examples, the private keys may include a user key, a peer reviewer key, and/or an authorization authority key. The parameters of the request may include a name of the process, tasks or jobs associated with the process, one or more target environments, a date and a time of the request, an alias of a user requesting to execute the process, a level of authorization required for the process, a number and a type of the authorizers required based on the level of authorization, and/or a number of times the process is allowed to be executed with this request. The parameters of the request may be defined by the user requesting to execute the process or automatically.

In yet further examples, the level of authorization may include auto-signed, self-signed, remote-signed, and/or multiple party remote-signed. The process may be an existing script, an existing command, a custom script, and/or a configuration file. The execution of the process may be allowed at one or more other target environments using the key if the other target environments are included within the parameters associated with the request.

According to some embodiments, servers configured to implement a multi-factor execution gateway may be described. An example server may include a communication interface configured to facilitate communication between another server hosting a target environment, one or more client devices, and the server, a memory configured to store instructions, and one or more processors coupled to the communication interface and the memory. The processors may be configured to detect a request to execute a process in the target environment, generate a fingerprint based on one or more parameters associated with the request, receive a signature for the fingerprint to generate a key, where the signature is in form of one or more private keys acquired from one or more authorizers based on a level of authorization required for execution of the process, and allow the execution of the process at the target environment using the key, where the key may be transmitted to the other server through the communication interface and the process may be executed in response to a determination that information within the key matches a set of expected public keys and the request.

In other embodiments, the one or more processors may be further configured to intercept the request as it is transmitted to the other server from a client application executed on the client devices. The information within the key may include the signature in the form of the private keys acquired from the authorizers and the fingerprint. The information within the key may match the set of expected public keys and the request if the private keys acquired from the authorizers correspond to the set of the expected public keys and if the fingerprint corresponds to the parameters of the request. The set of expected public keys may be comprised of public keys corresponding to a minimal number and type of private keys to be acquired for the signature of the fingerprint.

According to other examples, systems configured to implement a multi-factor execution gateway to allow execution of a process at a target environment within the system may be described. An example system may include the multi-factor execution gateway and a server of the system hosting the target environment. The multi-factor execution gateway may include a communication interface configured to facilitate communication between the multi-factor execution gateway, the server of the system hosting the target environment, and one or more client devices, a memory configured to store instructions, and one or more processors coupled to the communication interface and the memory. The processors may be configured to detect a request to execute the process in the target environment, generate a fingerprint based on one or more parameters associated with the request, receive a signature for the fingerprint to generate a key, where the signature may be in form of one or more private keys acquired from one or more authorizers based on a level of authorization required for execution of the process, and transmit the key to the server through the communication interface to allow the execution of the process at the target environment using the key. The server of the system hosting the target environment, may include a memory configured to store instructions, and one or more processors coupled to the memory. The processors may be configured to upon receipt of the key from the multi-factor execution gateway, validate the key in response to a determination that information within the key matches a set of expected public keys and the request, and execute the process in the target environment.

In other examples, the system may be a datacenter. The multi-factor execution gateway may be located outside of the target environment. The level of authorization for the process may be based on a risk that the execution of the process presents to safety and compliance within the target environment. Additional information may be added to the fingerprint to limit a time window of the execution of the process and a scope of the execution of the process to reduce the risk that the execution of the process presents to the safety and compliance within the target environment.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to implement a multi-factor execution gateway, the method comprising:
   detecting a request to execute a process in a target environment;
   generating a fingerprint based on one or more parameters associated with the request and adding to the generated fingerprint additional information that defines a time window and a scope of execution of the process in accordance with a risk presented by the execution of the process to safety and compliance within the target environment;
   receiving a signature corresponding to the fingerprint and generating a key based on the received signature, wherein the signature includes data representing a private key acquired from an authorizer based on a level of authorization corresponding to the execution of the process; and
   allowing the execution of the process at the target environment using the key.

2. The method of claim 1, wherein allowing execution of the process at the target environment using the key comprises:
   transmitting the key to the target environment, wherein information within the key is compared to a set of expected public keys and the request in order to validate the key.

3. The method of claim 2, wherein the key is validated and the process is executed at the target environment in response to a determination that the information within the key matches the set of expected public keys and the request.

4. The method of claim 2, wherein the key is rejected and the process is prevented from being executed at the target environment in response to a determination that the information within the key does not match one or both of the set of expected public keys and the request.

5. The method of claim 1, wherein the private key includes one or more of a user key, a peer reviewer key, or an authorization authority key.

6. The method of claim 1, wherein the one or more parameters of the request include one or more of a name of the process, tasks or jobs associated with the process, one or more target environments, a date and a time of the request, an alias of a user requesting to execute the process, a level of authorization required for the process, a number and a type of the one or more authorizers required based on the level of authorization, and a number of times the process is allowed to be executed with this request.

7. The method of claim 6, wherein the one or more parameters of the request are defined by one of the user requesting to execute the process and automatically.

8. The method of claim 1, wherein the level of authorization includes one or more of auto-signed, self-signed, remote-signed, and multiple party remote-signed.

9. The method of claim 1, wherein the process is one or more of an existing script, an existing command, a custom script, and a configuration file.

10. The method of claim 1, further comprising:
    allowing the execution of the process at one or more other target environments using the key if the one or more other target environments are included within the one or more parameters associated with the request.

11. A server configured to implement a multi-factor execution gateway, the server comprising:
- a communication interface configured to facilitate communication between another server hosting a target environment, one or more client devices, and the server;
- a memory configured to store instructions; and
- one or more processors coupled to the communication interface and the memory, the one or more processors configured to:
  - detect a request to execute a process in the target environment;
  - generate a fingerprint based on one or more parameters associated with the request and adding to the generated fingerprint additional information that defines a time window and a scope of execution of the process in accordance with a risk presented by the execution of the process to safety and compliance within the target environment;
  - receive a signature corresponding to the fingerprint to generate a key, wherein the signature includes data representing a private key acquired from an authorizer based on a level of authorization corresponding to the execution of the process; and
  - allow the execution of the process at the target environment using the key, wherein the key is transmitted to the other server through the communication interface and the process is executed in response to a determination that information within the key matches a set of expected public keys and the request.

12. The server of claim 11, wherein the one or more processors are further configured to intercept the request as it is transmitted to the other server from a client application executed on the one or more client devices.

13. The server of claim 11, wherein the information within the key includes the private key acquired from the authorizer and the fingerprint.

14. The server of claim 13, wherein the information within the key matches the set of expected public keys and the request if the private key acquired from the authorizer corresponds to the set of the expected public keys and if the fingerprint corresponds to the one or more parameters of the request.

15. The server of claim 14, wherein the set of expected public keys is comprised of public keys corresponding to a minimal number and type of private keys to be acquired for the signature of the fingerprint.

16. A computing device configured to implement a multi-factor execution to allow execution of a process at a target environment hosted by a server in a computing system having multiple servers, the computing device comprising:
- a processor; and
- a memory operatively coupled to the processor and storing instructions executable by the processor to cause the computing device to:
  - detect a request to execute the process in the target environment;
  - generate a fingerprint based on one or more parameters associated with the request and adding to the generated fingerprint additional information that defines a time window and a scope of execution of the process in accordance with a risk presented by the execution of the process to safety and compliance within the target environment;
  - receive a signature corresponding to the fingerprint and generating a key based on the received signature, wherein the signature includes data representing a private key acquired from an authorizer based on a level of authorization corresponding to the execution of the process; and
  - transmit the key to the server to allow the execution of the process at the target environment using the key.

17. The computing device of claim 16, wherein the one or more parameters of the request include one or more of a name of the process, tasks or jobs associated with the process, one or more target environments, a date and a time of the request, an alias of a user requesting to execute the process, a level of authorization required for the process, a number and a type of the one or more authorizers required based on the level of authorization, and a number of times the process is allowed to be executed with this request.

18. The computing device of claim 16, wherein the computing device is located outside of the target environment.

19. The computing device of claim 16, wherein the level of authorization for the process is based on the risk that the execution of the process presents to safety and compliance within the target environment.

20. The computing device of claim 16, wherein the information within the key includes the one or more private keys acquired from the one or more authorizers and the fingerprint.

* * * * *